United States Patent [19]

Mottram et al.

[11] Patent Number: 4,502,873
[45] Date of Patent: Mar. 5, 1985

[54] METHOD AND APPARATUS FOR CONCENTRATING OXYGEN

[75] Inventors: William R. Mottram, Boulder; Gene A. Fisher, Lafayette; Louis Feierabend, Boulder, all of Colo.

[73] Assignee: Proto-Med, Inc., Boulder, Colo.

[21] Appl. No.: 402,270

[22] Filed: Jul. 27, 1982

[51] Int. Cl.³ .............................................. B01D 53/04
[52] U.S. Cl. ........................................ 55/179; 55/389; 417/269
[58] Field of Search ................... 55/21, 68, 75, 163, 55/179, 389; 417/269

[56] References Cited

U.S. PATENT DOCUMENTS

| 1,819,966 | 8/1931 | Olson | 417/269 |
|---|---|---|---|
| 3,324,631 | 6/1967 | Kreuter | 55/163 |
| 3,659,399 | 5/1972 | Kauer, Jr. et al. | 55/163 X |
| 3,778,967 | 12/1973 | Kauer, Jr. et al. | 55/21 |
| 3,922,149 | 11/1955 | Ruder et al. | 55/21 |
| 4,138,203 | 2/1979 | Slack | 417/269 |
| 4,194,891 | 3/1980 | Earls et al. | 55/179 X |
| 4,222,750 | 9/1980 | Gauthier et al. | 55/68 X |
| 4,231,768 | 11/1980 | Seibert et al. | 55/179 |
| 4,272,265 | 6/1981 | Snyder | 55/179 X |
| 4,302,224 | 11/1981 | McCombs et al. | 55/179 X |
| 4,331,455 | 5/1982 | Sato | 55/21 |
| 4,331,457 | 5/1982 | Morner | 55/163 |
| 4,349,357 | 9/1982 | Russell | 55/21 |
| 4,373,938 | 2/1983 | McCombs | 55/179 X |
| 4,378,982 | 4/1983 | McCombs | 55/179 X |
| 4,386,945 | 6/1983 | Gardner | 55/68 X |

Primary Examiner—Robert Spitzer
Attorney, Agent, or Firm—Young & Martin

[57] ABSTRACT

The disclosure of this invention includes a pressure swing adsorption oxygen concentrator having a plurality of zeolitic molecular sieve beds. The pressure and air flow in each bed is alternately charged between pressurizing and air flow in one direction to bleeding and counter flow in the opposite direction. Each time this change occurs, additional oxygen enriched gas from the pressurized bed to increase the incremental oxygen purity. These changes in this invention are initiated by a pressure sensitive transducer which detects a predetermined upper pressure limit. The air compressor drive includes a spring-biased swash plate which reciprocates the piston rods of reciprocating piston compressor pumps.

3 Claims, 6 Drawing Figures

METHOD AND APPARATUS FOR CONCENTRATING OXYGEN

BACKGROUND OF THE INVENTION

This invention is related to producing oxygen gas suitable for human breathing, and more specifically to pressure swing adsorption air separation using selective molecular sieves.

It is known that some zeolitic materials have the characteristic of adsorbing nitrogen and oxygen from the air and that the selectivity of such zeolitic materials for nitrogen adsorption in relation to oxygen adsorption increases as pressure increases. Therefore, as air is injected under pressure into a zeolitic material, the zeolitic material adsorbs a greater proportion of nitrogen than oxygen. When the zeolitic material is packed in an elongated container, a stream of air injected under pressure into one end of the container is progressively stripped of a portion of its nitrogen content, which results in a proportionately higher oxygen content in the air stream toward the downstream end of the container. Therefore, the air in the downstream end of the container after it has passed through the zeolitic material under pressure is oxygen enriched.

As that flow of air through the zeolitic molecular sieve continues, the zone of increaed nitrogen adsorption advances through the length of the container toward the discharge end. When this zone or nitrogen front nears the discharge end, the effectiveness of the oxygen concentration near the discharge end diminishes. If the flow of air is continued long enough, the nitrogen front will replace the zone of oxygen enriched air at the discharge end of the container, and the effectiveness of the molecular sieve for producing oxygen will be virtually eliminated. However, by bleeding the pressure from the inlet or injection end of the container and allowing air to flow therethrough in the reverse direction, the zeolitic molecular sieve can be purged of the adsorbed nitrogen. The pressure drop resulting from bleeding and exhausting the inlet end causes the nitrogen adsorption selectivity of the zeolitic material to decrease and swing toward increased selectivity to oxygen adsorption. Consequently, the combination of bleeding pressure and reversing the flow of the air stream through the zeolitic material results in purging and exhausting the nitrogen from the container.

This selective nitrogen adsorption characteristic of zeolitic materials is used advantageously to produce oxygen for a variety of uses, including for breathing by persons, such as those with respiratory ailments, who benefit from breathing oxygen in higher concentration or purity than that naturally occurring in the air. However, in order to reach a useful oxygen purity level for breathing, it is necessary to increase the oxygen enrichment of the gas to a significantly greater extent than that achieved by one pressure and flow cycle.

The U.S. Pat. No. 4,194,891, issued to Earls et al, discloses a method and apparatus for "bootstrapping" the oxygen enrichment level of the gas through a plurality of cycles of pressurized air injection into the zeolitic material followed by bleeding off the pressure and reverse flow of air or gas through the zeolitic material. This "bootstrapping" effect is achieved by introducing a portion of the oxygen enriched air previously produced into the discharge end of the zeolitic material container during the bleeding and reverse flow phase of the cycle. Therefore, when the new cycle begins by injecting air under pressure into the inlet end of the container, there is a head start of increased oxygen concentration in the container. Consequently, the enriched oxygen concentration produced near the discharge end during the next phase of pressurizing and flowing air through the zeolitic material is enriched an increment greater than the preceeding cycle. This incremental increase in oxygen purity results from the oxygen added during the preceeding bleeding and purging phase.

The Earls et al U.S. Pat. No. 4,194,891 teaches the use of a plurality of containers of zeolitic molecular sieve material. The cycles in each container are not in phase with the other containers so that some oxygen enriched gas is always available from one container in the pressure and air injection phase to another container in the bleed and reverse flow phase. The Earls et al patent teaches the addition of a portion of the oxygen enriched gas from one container to another container while the remaining portion is used for breathing or other useful purposes. With the repetition of these cycles over a period of time, including injection of oxygen enriched gas during bleeding and purging, each cycle achieves a higher oxygen purity level to a range of 88 to 98 percent oxygen.

While this "bootstrapping" process of repeated cycles and adding increasingly oxygen enriched gas to the purge phase of the cycles is effective to reach the level of an enriched oxygen gas suitable for breathing, some problems remain. For example, prior art methods and apparatus, such as that described in the Earls et al patent, have exceedingly complex flow circuits with numerous valves and timer control devices that must be set relative to such parameters as length of container, air injection rate, pressures and the like. They are also bulky and heavy and are quite insufficient in energy consumption.

SUMMARY OF THE INVENTION

Accordingly, it is an object of this invention to provide a novel cycle control method and apparatus for pressure swing adsorption air separation process utilizing a plurality of zeolitic molecular sieves out of phase with each other that is relatively simple but effective.

It is also an object of this invention to provide pressure swing adsorption apparatus that is relatively light weight, easy to use, and energy efficient.

A still further object of this invention is to provide an oxygen concentrator having a unique air pump that has self-controlled upper pressure limit and idling functions to produce relatively high volume low pressure compressed air in intermittent cycles as required by the swing pressure adsorption oxygen concentration apparatus of this invention.

The present invention includes a system for switching from a phase of pressurizing one zeolitic molecular sieve bed and bleeding the other bed to pressurizing the other bed and bleeding the one bed by pressure sensitive controls. A discharge line from each bed leads to a common chamber in which a pressure transducer is located. The pressure transducer causes a solenoid valve to switch phases when the chamber reaches a predetermined upper limit. A purge line also connects the discharge ends of each bed together, and a flow restrictor in the purge line controls the proportion of oxygen enriched gas allowed to flow into the bed being bled and purged.

The invention also includes a compressor drive having a swash plate biased by a compression spring to an acute angle to the drive shaft. The compressor piston rods of reciprocating piston compressors are connected to the swash plate, so increased pressure on the pistons causes the swash plate to move against the bias of the spring toward a right angle relation to the drive shaft.

BRIEF DESCRIPTION OF THE DRAWINGS

Other objects, advantages, and capabilities of the present invention will become more apparent as the description proceeds, taken in conjunction with the following drawings, in which.

DESCRIPTION OF THE PREFERRED EMBODIMENT

The oxygen concentrator apparatus 10 of the present invention is comprised essentially of compressor apparatus 70 for compressing air, two sets of zeolite molecular sieves for separating oxygen from air, a valve 100 and pressure control and balancing components for effecting oxygen concentration in the zeolite containers, and flow control components for using the oxygen enriched concentrated gas.

Figures 1, 2:
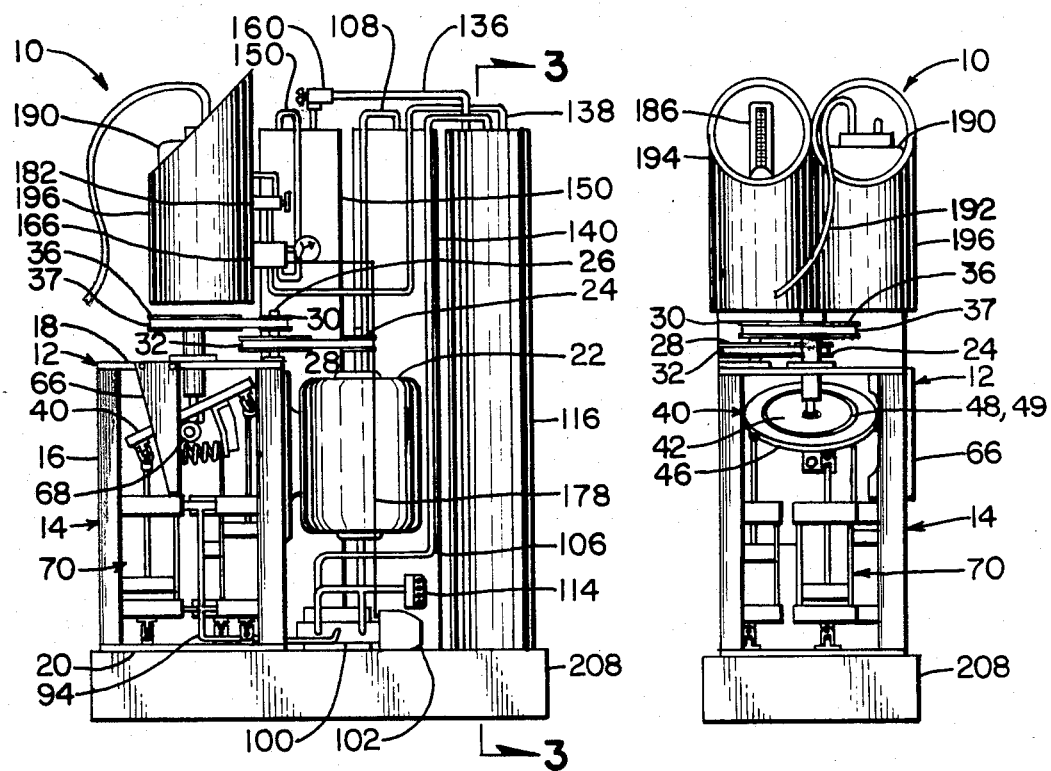
FIG. 1 is a side elevation view of the oxygen concentrator apparatus of the present invention.
FIG. 2 is a front elevation view of the oxygen concentrator apparatus of the present invention.
Figures 3, 5:
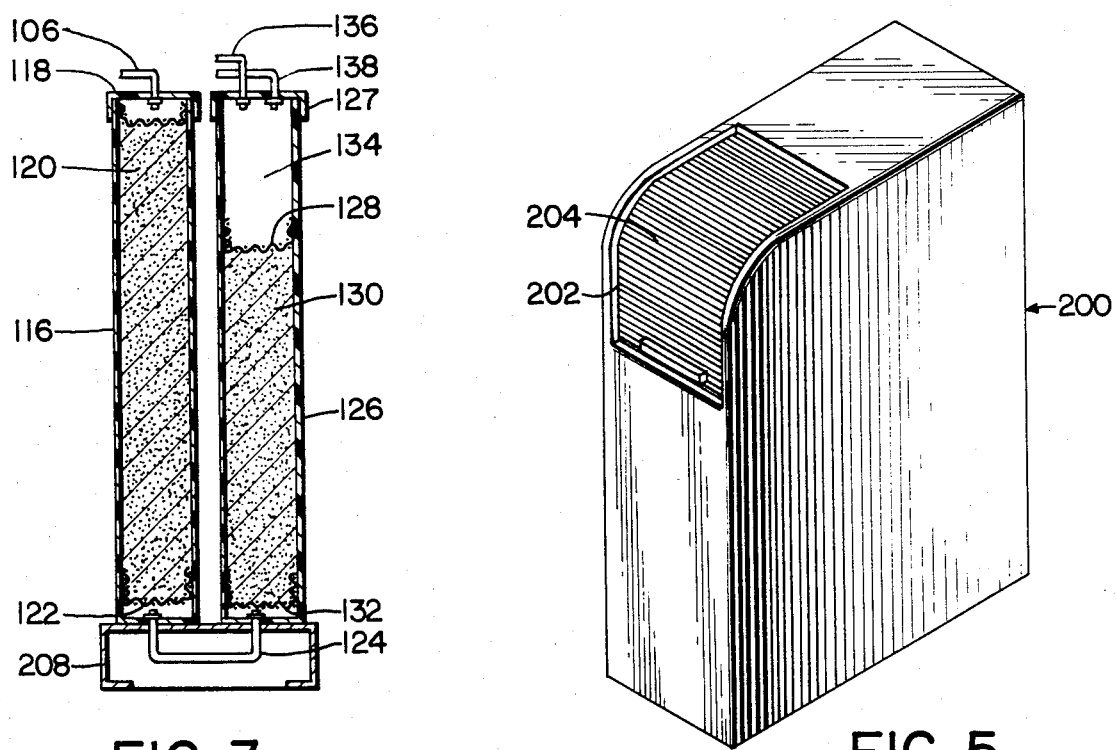
FIG. 3 is a cross sectional view of the zeolite containers taken along lines 3—3 of FIG. 1.
FIG. 5 is a perspective view of a decorative cabinet/cover for the oxygen concentrator of the present invention.
Figure 6:
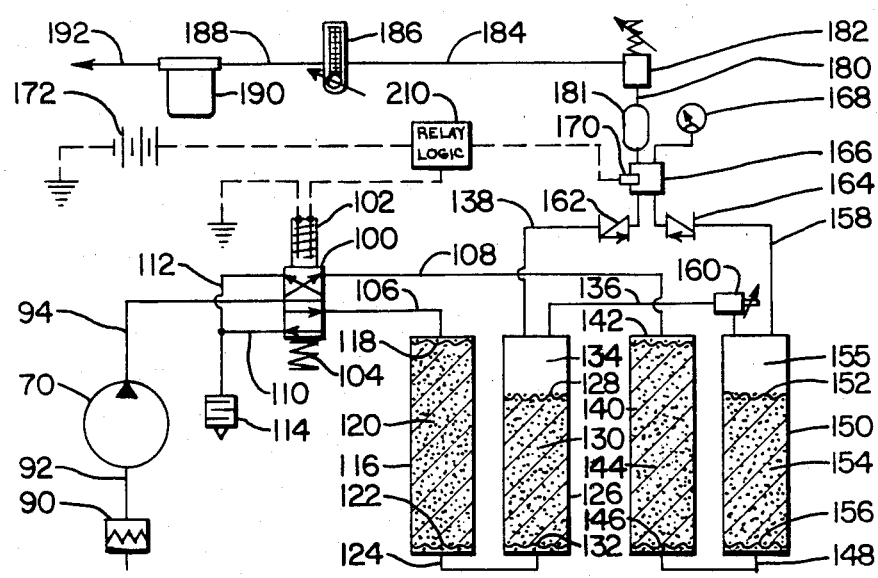
FIG. 6 is a schematic flow diagram of the oxygen concentrator of the present invention.

Referring now primarily to FIG. 6 in combination with FIGS. 1, 2 and 3, two pairs of zeolite molecular sieves are provided for producing oxygen enriched gas. Cylindrical containers 116, 126 are tied together to function as one molecular sieve unit in the cyclic portion of the "bootstrapping" pressure swing adsorption oxygen concentration process, and cylindrical containers 140, 150 are tied together to function as a second molecular sieve unit. These containers 116, 126, 140, 150 are positioned in an upright orientation on the base 208.

A tube 124 extends from the bottom of container 116 to the bottom of container 126 to put these two containers 116, 126 in fluid flow relation to each other. The interior of container 116 is packed with a zeolitic molecular sieve material 120 between a bottom screen 122 and top screen 118. A cap 117 encloses the end of container 116, and a gas flow line 106 extends through cap 117 to inject gas into and bleed gas from the interior of container 116. Container 126 is also packed with a quantity of zeolitic molecular sieve material 130 between a bottom screen 132 and top screen 128. However, the top screen 128 is positioned a spaced distance below the cap 127 to leave a reservoir space 134 at the top of container 126. Flow lines 136 and 138 extend through the cap 127 to inject gas into and bleed gas from the interior of container 126.

The second pair of containers 140, 150 are structured basically the same as containers 116, 126. Container 140 is packed with a zeolitic molecular sieve material 144 between a top screen 142 and bottom screen 146, and container 150 is packed with a zeolitic molecular sieve material 154 between top sieve 152 and bottom sieve 156. The bottom screen 152 is a spaced distance downwardly from the top of container 150 to leave a reservoir 155 therein for accumulating concentraed oxygen enriched gas. A tube 148 extending from the bottom of container 140 to the bottom of container 150 connects containers 140, 150 in fluid flow relation to each other.

The compressor assembly 70 draws ambient air through an inlet filter 90 and suction line 92, compresses the air, and directs it under pressure to either container 116 or container 140. The solenoid actuated four way valve 100 in line 94 directs the compressed air in line 94 to line 106 for injection into container 116 and alternately through line 108 for injection into container 140. As the valve 100 connects line 94 with line 106, it simultaneously connects line 108 with exhaust line 112 for bleeding or exhausting gas from container 140. Likewise, when valve 100 connects line 94 with line 108 to pressurize container 140, link 106 is connected simultaneously with exhaust line 110 to bleed pressure from container 116. The exhaust lines 110, 112 discharge the exhaust gas through a muffler 114.

Actuation of the solenoid 102 is effective to shift valve 100 to direct compressed air from line 94 through line 106 to pressurize container 116 and to bleed the pressure from container 140. Deactivation of solenoid 102 allows spring 104 to shift valve 100 back to the position wherein pressurized gas from line 94 is directed through line 108 to container 140 while pressure is bled from container 116. Solenoid valve 102 is powered by any convenient or appropriate electric power source represented as a battery 172 in FIG. 6, but which could be a transformer (not shown), or the like. Relay logic 210 responsive to pressure in a chamber 166 controls electrical actuation and deactuation of solenoid 102 to cycle the pressure swing adsorption oxygen concentration process, as will be described in more detail below.

Oxygen can be concentrated at one end of a zeolite material container by "bootstraping" incremental additional amounts of oxygen in that area through repetitious cycling from a phase of high pressure flow of air in one direction through the container and a phase of low pressure in a reverse flow or countercurrent. One of the unique features of this invention includes an apparatus and method utilized to balance and control the phase changes in the cycle from one pair of containers 116, 126 to the other pair of containers 140, 150 for optimum oxygen enrichment of the air and efficient use of energy. This apparatus and method is pressure sensitive and is not oriented to time or container size.

As pressurized air is directed through line 106 to the top of container 116, pressure begins to build in the top end of container 116. Line 124 connects the bottom of container 116 to the bottom of container 126 so that pressure also begins to build in the bottom of container 126. As the pressure in containers 116, 126 increases, the zeolitic material 120, 130 adsorbs incrementally larger proportions of nitrogen than oxygen. Therefore, an incrementally larger proportion of oxygen from the air flowing therethrough is allowed to gather in the upper end of the zeolite 130 and in the reservoir 134 of container 126. Some of this oxygen enriched air then flows out of container 126 through line 136 and through line 138. A flow restrictor 160 in line 136 allows only a portion of the oxygen enriched air from the top of container 126 to flow into the upper end of container 150.

The remaining proportion of the flow of oxygen enriched air from container 126 flows through line 138 and through one way check valve 162 into the pressure chamber 166. From pressure chamber 166, that portion of oxygen enriched air continues to flow through line 180 and accumulator or surge tank 181, and through lines 184, 188, and 192 to the point of use. The point of use of the oxygen enriched air is typically a canula (not shown) adapted for insertion into a person's nose for breathing the oxygen enriched air.

A pressure regulator 182 is positioned in line 184 to hold a back pressure in chamber 166 and to allow discharge of oxygen in a pre-selected maximum pressure threshold appropriate for its use, such as approximately 4 p.s.i. for a canula. Therefore, to the extent that the oxygen from the upper end of container 126 is not released for use through pressure regulator 182 or flow restrictor 160 to container 150, pressure is built up in pressure chamber 166. A one way check valve 164 in line 158 prevents back flow of the oxygen from pressure chamber 166 into container 150.

When the pressure in chamber 166 reaches a predetermined optimum threshhold, such as 12 to 15 p.s.i., the relay logic 210 actuates solenoid 102 to shift valve 100. Upon shifting valve 100 to the alternate position the pressurized air from line 94 is rerouted through line 108 to the upper end of container 140. Simultaneously, the pressure previously built up in containers 116, 126 immediately begins to bleed through line 106 to exhaust into the atmosphere through muffler 114. As pressure in containers 116, 126 decreases, the nitrogen selectivity of the zeolitic material 120, 130 therein decreases. Therefore, the nitrogen adsorbed by the zeolite material 120, 130 is released or desorbed and is exhausted through lines 106 to the atmosphere.

During this bleed phase of containers 116, 126, the pressure drop in containers 116, 126 causes the zeolitic material 120, 130 to absorb additional increments in proportion of oxygen. At the same time, container 140 is being pressurized by air through line 108. As the pressure in containers 140, 150 increases, increasingly larger proportions of nitrogen is adsorbed by the zeolitic material therein leaving an enriched oxygen gas at the upper end of container 150 and in the reservoir area 155. A restricted portion of that oxygen enriched gas from reservoir 155 flows through the flow restrictor 160 and through line 136 to the upper end of container 126. This flow of oxygen enriched gas into the upper end of container 126 adds to the oxygen adsorbed by the zeolitic material 130 under low pressure. This additional enrichment of oxygen enriched gas provides the "bootstrapping" effect for building the proportion of oxygen in the gas therein to higher levels of oxygen purity. The remaining proportion of oxygen enriched gas flows from container 150 flows through line 158 and one way check valve 164 into the pressure chamber 166. The check valve 162 in line 138 prevents the back flow of gas from chamber 166 into container 126. Of course, the oxygen enriched gas from chamber 166 flows as described above through lines 180, 184, 188, 192 to the point of use.

Upon reaching the threshhold of about 12 to 15 p.s.i. in chamber 166 in this cycle, the electronic relay logic circuit 210 again energizes solenoid 102 to shift valve 100 for reversing this phase of the cycle to again pressurize containers 116, 126 and bleed the pressure from containers 140, 150. In this new cycle, nitrogen is again adsorbed by the zeolitic material allowing an enriched oxygen proportion to flow to the reservoir 134 at the top of container 126, which is added to the already enriched oxygen concentration therein. Again, a porportion of this additionally oxygen enriched gas flows through line 136 and flow restrictor 160 to the upper end of container 150 to enrich the oxygen concentration therein, while the remainder of the flow is directed through line 138 to pressure chamber 166 and to the ultimate use point at the end of line 192. The flow restrictor 160 is adjustable to accommodate fine tuning the cycle to produce an optimum volume of enriched oxygen for use of the desired purity level.

The relay logic 210 can be wired in any of a number of state of the art configurations for shifting the vavle 100 from a first position to a second position when pressure in pressure chamber 166 reaches the threshhold 12 to 15 p.s.i. from container 126 and for shifting the valve 100 back to the first position again when pressure in pressure chamber 166 reaches 12 to 15 p.s.i. from container 150. One example of appropriate logic is to utilize a pressure transducer 170 in chamber 166 that varies voltage output in direct proportion to pressure in the chamber 166. This variable voltage output from the transducer 170 is then amplified and compared to a fixed voltage from a zener diode. When the transducer voltage is greater than the reference voltage, a diode in a comparator fires a voltage pulse. The pulses go through a divide by two system so the first pulse charges to up state to energize the solenoid 102, and the second pulse reverts to down state to de-energize the relay. The significant feature herein is to effect automatic cycling in response to an optimum pressure threshhold.

A flow rate measuring device and adjustable rate valve 186 is positioned in line 184 to allow the user to adjust the rate of oxygen flow to the desired level. Also, a humidifier 190 is positioned in line 188 to add moisture to the flow of oxygen to decrease the irritating effect of dry oxygen in the membranes of a person's nose. The humidifier is basically a water container through which the oxygen enriched gas is bubbled before it is delivered to the canula.

Figure 4:
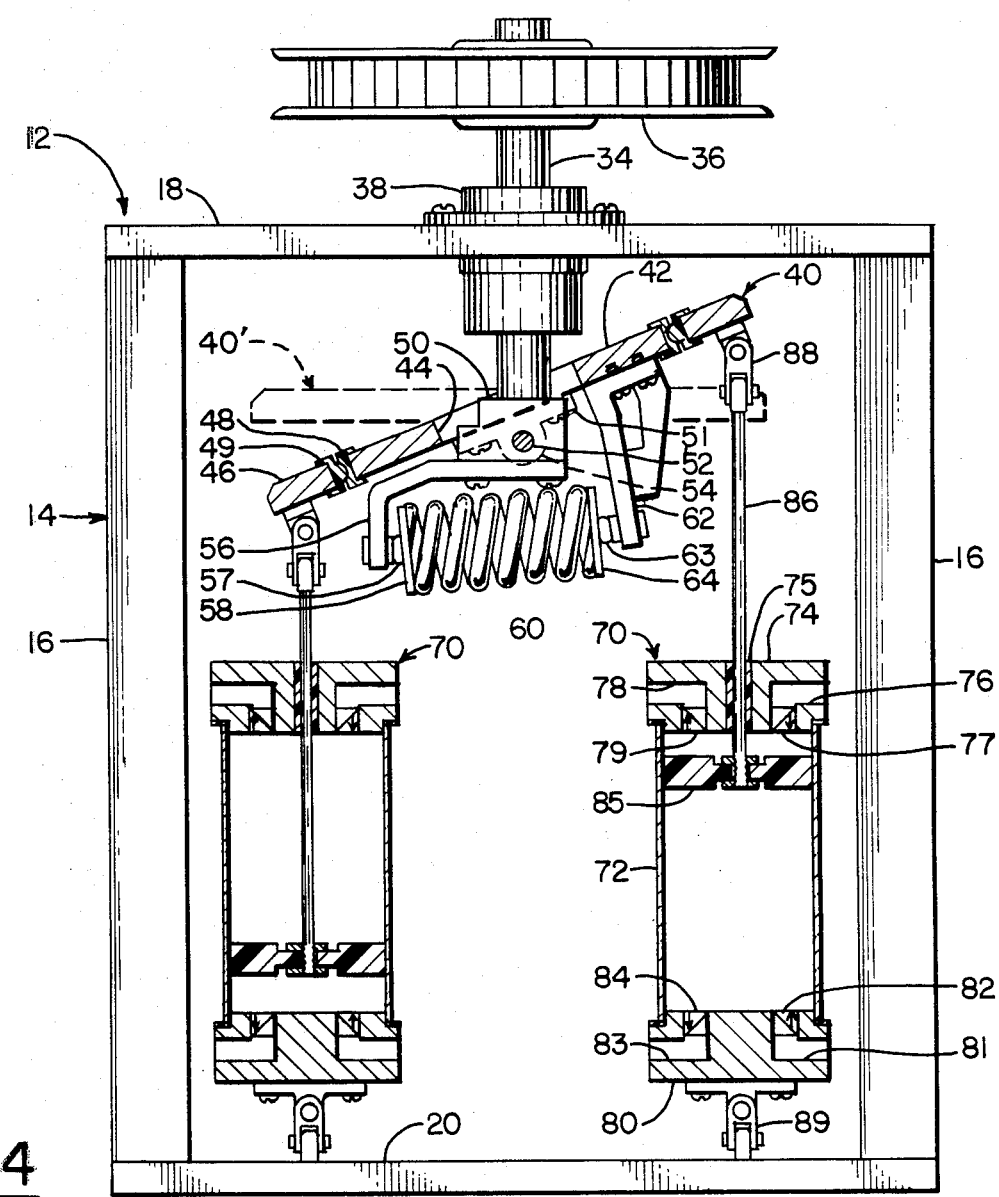
FIG. 4 is an enlarged elevation view, partially in section, of the compressor apparatus of the present invention.

Another unique feature of this invention is the compressor assembly 12, as best seen in FIG. 4. it includes a frame 14 comprised of a plurality of upright columns 16 attaching together in spaced-apart relation to each other an upper plate 18 and lower plate 20. A plurality of reciprocating piston type air compressors 70 are positioned in the frame 14 and attached by universal joints 89 to the bottom plate 20. Each compressor is structured in a state of the art manner having an elongated cylindrical chamber 72 with a piston 85 slidably positioned therein. A piston rod 86 extends upwardly from the piston 85 through a bushing 75 in upper cylinder head 74. The upper cylinder head 74 is positioned on and seals the upper end of cylinder 72 and includes an intake duct 76 and discharge duct 78 therethrough. A check valve 77 positioned in intake duct 76 allows air to flow into the cylinder 72 through intake duct 76 but prohibits a reverse flow of air outwardly through duct 76. Another check valve 79 positioned in discharge duct 78 allows air to flow out of the cylinder 72 through duct 78, but prohibits the air from flowing through duct 78 into the cylinder 72.

Likewise, a bottom cylinder head 80 is positioned on and seals the lower end of cylinder 72. It includes an inlet duct 81 with a check valve 82 for allowing air to flow into cylinder 72, and it includes a discharge duct 83 with a check valve 84 positioned therein to allow air to flow only outwardly through duct 83. Therefore, as the piston 85 reciprocates upwardly and downwardly in cylinder 72, ambient air is drawn in through inlet ports 76, 81 where it is compressed in cylinder 72 and discharged under pressure through discharge ports 78, 83.

The piston drive assembly for reciprocating the pistons 85 of compressor 70 upwardly and downwardly is comprised of a variable angle swash plate 40. The swash plate 40 is comprised of an inner circular ring portion 42 and an outer circular ring portion 46. The outer ring portion 46 is positioned concentrically around the peripheral surface of the inner ring 42 and is slidably retained in that position by a pair of nylon or teflon bearings interfaced together to allow the inner ring 42 to rotate in relation to the outer ring 40 with a minimum of friction. The inner ring 42 is intended to rotate with main shaft 34, while the outer concentric ring 46 is prevented from rotating by a guide wheel 68 bearing against a stationary guide plate 66 (shown in FIG. 1).

The inner concentric ring 42 has a center hole 44 therein which allows protrusion therethrough of the main shaft 34 and hub 50. Hub 50 is fastened to main shaft 34 by set screw 51 so that it rotates with main shaft 34. Main shaft 34 is rotated by pulley 36 and is journaled in the upper plate 18 by a bearing block 38.

The hub 50 has a pivot pin 52 extending transversely therethrough in such a manner that it protrudes outwardly from diametrically opposite lateral sides of hub 50. The ends of the pivot pin 52 extend into a pair of pivotal mounting brackets 54, which are fastened to the inner concentric ring 42 of swash plate 40. For clarity of illustration, only one of these pivotal mounting brackets 54 is shown in broken lines positioned behind the hub 50. The other pivotal mounting brackets 54, which has been removed in the drawing by cutting the cross section through swash plate 40 for illustration, is normally positioned on the pivot pin 52 in front of the hub 50. Therefore, the inner concentric ring 42 rotates with main shaft 34, but it is also pivotal about the axis of pin 52 in relation to main shaft 34.

When the swash plate 40 is positioned at an acute angle to the axis of main shaft 34, rotation of the inner concentric ring 42 in relation to the stationary outer concentric ring 46 causes the outer concentric ring 46 to rock upwardly and downwardly in relation to the compressors 70. The upper ends of the piston rods 86 are attached by universal joints 88 to the outer concentric ring 46 in spaced-apart relation to each other. Therefore, the rocking motion of the outer concentric ring 46 in relation to the compressor 70 drives the piston rods 86 upwardly and downwardly. Of course, the upward and downward motion of piston rod 86 and piston 85 is operative to compress air in the cylinder 72 as described above.

Any desired number of compressors 70 can be positioned under the swash plate 40 and driven thereby as space allows. Two of such compressors 70 are shown in FIG. 4, and the preferred embodiment shown in FIGS. 1 and 2 illustrate three compressors positioned under the swash plate 40.

A unique feature of this invention is the pressure control feature of the swash plate compressor drive system illustrated in FIG. 4. This pressure control system includes a compression spring 60 mounted between brackets 56, 62. Mounting bracket 56 is rigidly attached to the bottom surface of hub 50, and the opposite mounting bracket 62 is rigidly attached to the bottom surface of inner concentric ring 42. The compression spring 60 is retained in this position by a pair of keepers 58, 64 on opposite ends thereof which are retained between brackets 56, 62 by bell connectors 57, 63, respectively.

The axially outward force exerted by spring 60 on bracket 62 biases the swash plate 40 to an acute angle with the main shaft 34. The swash plate 40 maintains this attitude as long as there is minimal force exerted on the swash plate 40 by the piston rods 86 of compressor 70. However, as pressure in the cylinders 72 of compressor 70 increase, increasingly large forces are required to reciprocate the pistons 85. Therefore, as the pressure in the cylinder 72 increases, the piston rods 86 exert increasingly large vertical forces on the outer concentric ring 46. As these forces increase sufficiently to overcome the axially outward force exerted by spring 60 on bracket 62, the spring 60 begins to yield and the swash plate 40 pivots about pin 52 to decrease the angle between swash plate 40 and main shaft 34. Theoretically, if the compressors 70 are spaced equally around the perimeter of the swash plate 40, and as the pressure therein increases to a sufficient extent, the spring 60 will compress a sufficient amount to allow the swash plate 40 to be rotated to a right angle in relation to shaft 34 as shown by broken lines 40'. In this right angle position, the inner concentric ring 42 merely rotates within the outer concentric ring 40 with no concurrent rocking motion, and the compressors 70 are essentially in a non-reciprocating idle mode.

The advantages of this compressor drive system are several. First, as the pressure in the oxygen concentrator system builds up to the 12 to 15 p.s.i. maximum threshhold, the length of the reciprocating strokes of the pistons 85 in compressor 70 decrease proportionally so that the volume of air compressed and pumped into the system is only that required to operate the system and meet the user flow rate as set by the rate indicator and valve assembly 186. Further, rather than requiring increased horsepower and energy consumption near the upper pressure peak of the cycle, the compressor 70 actually goes into an idle mode or a near idle mode so that the power requirements at high pressure are actually decreased.

The maximum pressure capabilities of the compressors 12 can be set by the strength of the compression spring 60 utilized in the assembly. If higher pressures are necessary, a stiffer spring 60 can be utilized. On the other hand, if lower upper pressure limits are desired, weaker springs 60 can be positioned in the assembly. This feature also provides an upper pressure limit on the system so that if one of the other components misfunctions to interrupt the normal cycling of the system, excess pressure will not build up in the system to damage lines or components. The pressure would only build up the extent allowed by the strength of the spring 60, at which point the swash plate 40 would move toward the right angle position 40' so that the compressor 70 would be in an idle mode with little or no reciprocation of pistons 85 therein.

The compressor assembly is driven by a motor 22 mounted on one side of the frame 14. A counter shaft 26 is mounted on one corner of the frame 12 and has a large pulley 28 driven by a small motor pulley 24 and a small pulley 30 which drives a larger main pulley 37 in order to reduce the speed to the proper gear ratio desired. The position of counter shaft 26 is adjustable so that it can also function as a belt tightener.

An asthetically pleasing cabinet or cover 200 as shown in FIG. 5 is provided to enclose the oxygen concentrator assembly 10 of the present invention. It includes an opening 202 with a slidable door 204 adjacent the mountng structures 194, 196 wherein the flow rate indicator and adjustment valve 186 and humidifier 190 are positioned. Therefore, the opening 202 provides ready access to the humidifier and the flow control and indicator assembly.

While the present invention has been described with some degree of particularly, it should be appreciated that the present invention is defined by the following claims construed in light of the prior art so that modifications or changes may be made to the preferred embodiment of the present invention without departing from the inventive concepts contained herein.

What we claim is:

1. In apparatus for producing oxygen enriched gas, including a plurality of zeolitic molecular sieve beds adapted for selectively adsorbing nitrogen at higher pressure and oxygen at lower pressure, wherein said apparatus operates in continuing repetitious cycles of a first phase wherein air is injected under pressure into one zeolitic molecular sieve bed to adsorb nitrogen at the injection end of said one bed and to concentrate oxygen at the discharge end of said one bed while discharging oxygen enriched gas at least partially into the discharge end and bleeding pressure from the injection end of another of said beds and a second phase wherein air is injected under pressure into said other bed to adsorb nitrogen at the injection end of said other bed and to concentrate oxygen at the discharge end of said other bed while discharging oxygen enriched gas at least partially into the discharge end and bleeding pressure from the injection end of said other bed, the improvement comprising:

automatic variable displacement compressor means for compressing air to a predetermined upper pressure limit and delivering the compressed air to said zeolitic molecular sieve beds, said compressor means including a reciprocating piston type compressor having an elongated cylindrical chamber, a piston slidably positioned in said chamber for compressing air, and a piston rod attached to said piston and extending upwardly out of said chamber for reciprocating said piston;

swash plate drive means for reciprocating said piston, said swash plate drive means including a circular disk-shaped inner plate member having a hole axially through the center thereof, a disk-shaped outer ring member with a hole axially therethrough of a radius approximately the same as the radius of said plate member slidably mounted concentrically around the peripheral surface of said inner plate member in such a manner that said inner plate member and said outer ring member are laterally immovable in relation to each other while said inner plate member is rotatable inside said outer ring member, a drive shaft extending into said hole in said inner plate member, pivotal mounting means for mounting said inner plate member pivotally to said main shaft in such a manner that said inner plate member and outer ring member are pivotal from a right angle to a range of acute angles in relation to said drive shaft, and a spring connected between said drive shaft and said inner plate member for biasing said inner plate member and said outer ring member to an acute angle in relation to said drive shaft, said piston rod being connected to said outer ring member.

2. The improvement of claim 1, including guide means on said outer ring member to prevent said outer ring member from rotating in relation to said compressor.

3. The improvement of claim 1, including a first rigid bracket mounted on said drive shaft and a second rigid bracket mounted to said inner plate member, and a compression spring positioned therebetween to bear on said brackets in such a manner as to force said inner plate member to an acute angle in relation to said drive shaft.

* * * * *

UNITED STATES PATENT AND TRADEMARK OFFICE
CERTIFICATE OF CORRECTION

PATENT NO. : 4,502,873

DATED : March 5, 1985

INVENTOR(S) : William R. Mottram, Gene A. Fisher, Louis Feierabend

It is certified that error appears in the above-identified patent and that said Letters Patent is hereby corrected as shown below:

In column 4, line 21, delete "link" and substitute --line--.
In column 7, line 23, delete "34" and substitute --44--.

Signed and Sealed this

Thirteenth Day of August 1985

[SEAL]

Attest:

DONALD J. QUIGG

Attesting Officer     Acting Commissioner of Patents and Trademarks